(12) United States Patent
O'Brien et al.

(10) Patent No.: US 10,558,683 B2
(45) Date of Patent: Feb. 11, 2020

(54) SELECTION OF A START TIME FOR A PERIODIC OPERATION

(71) Applicant: Oracle International Corporation, Redwood Shores, CA (US)

(72) Inventors: John Timothy O'Brien, Louisville, CO (US); Yinglei Wang, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 418 days.

(21) Appl. No.: 15/405,148

(22) Filed: Jan. 12, 2017

(65) Prior Publication Data

US 2018/0157728 A1 Jun. 7, 2018

Related U.S. Application Data

(60) Provisional application No. 62/431,414, filed on Dec. 7, 2016.

(51) Int. Cl.
| | |
|---|---|
| *G06F 16/00* | (2019.01) |
| *G06F 16/27* | (2019.01) |
| *G06F 9/48* | (2006.01) |
| *G06F 9/50* | (2006.01) |

(52) U.S. Cl.
CPC .......... *G06F 16/27* (2019.01); *G06F 9/4887* (2013.01); *G06F 9/5038* (2013.01)

(58) Field of Classification Search
CPC .... G06F 9/4887; G06F 9/4843; G06F 9/4881; G06F 11/1461; G06F 9/5038; G06F 16/27
USPC .......................................................... 707/618
See application file for complete search history.

(56) References Cited

U.S. PATENT DOCUMENTS

| | | | |
|---|---|---|---|
| 2012/0051369 A1 | 3/2012 | Bryan et al. | |
| 2012/0158947 A1* | 6/2012 | Hassan | H04L 41/5022 709/224 |

FOREIGN PATENT DOCUMENTS

WO  2016/068930 A1  5/2016

* cited by examiner

*Primary Examiner* — Vincent F Boccio
(74) *Attorney, Agent, or Firm* — Invoke

(57) ABSTRACT

One or more embodiments include scheduling a new operation to be periodically executed. A start time for a new operation, to be periodically executed, is determined based on the start times of previously scheduled operations. The difference in value between a candidate start time and a start time of a previously scheduled operation is used to compute a cost for the candidate start time. A candidate start time, of all the candidate start times, with a lowest cost may be selected as the start time for the new operation.

17 Claims, 5 Drawing Sheets

SELECTION OF A START TIME FOR A PERIODIC OPERATION

PRIORITY CLAIM: CROSS-REFERENCE TO RELATED APPLICATION; BENEFIT CLAIM

This application claims the benefit of U.S. Provisional Application No. 62/431,414, filed Dec. 7, 2016 which is hereby incorporated by reference.

TECHNICAL FIELD

The present disclosure relates to the scheduling of a periodic operation. In particular, the present disclosure relates to scheduling an operation to minimize interference with other operations.

BACKGROUND

A periodic operation is an operation that occurs at regular intervals. For example, in a data replication operation, data such as files are periodically replicated from one storage location to another.

When executing a periodic operation, system resources are consumed. For example, replicating a file consumes disk input/output, memory, and network bandwidth, among other resources. The more operations that are performed at the same time, the higher the utilization level of the resources. When managing the scheduling of numerous periodic activities, it becomes difficult to select an optimal start time to avoid interference with previously scheduled activities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. OPERATION SCHEDULING FRAMEWORK
3. SCHEDULING A START TIME FOR A PERIODIC OPERATION
4. EXAMPLE EMBODIMENTS
5. MISCELLANEOUS; EXTENSIONS
6. HARDWARE OVERVIEW

1. General Overview

One or more embodiments include scheduling a new operation to be periodically executed. In an example, the new operation is a data replication operation. In a data replication operation, data may be copied from one data center to another data center. Other examples of operations that may be periodically executed include performing a virus scan, or saving a document as the document is edited by a user.

In an embodiment, a start time for a new operation, to be periodically executed, is determined based on the start times of previously scheduled operations. Candidate start times for the new operation are compared with start times of previously scheduled operations. The difference in value between a candidate start time and a start time of a previously scheduled operation is used to compute a cost for the candidate start time. The cost for a candidate start time increases in proportion to the difference in the values of the candidate start time and each of the start times of previously scheduled operations. A candidate start time, of all the candidate start times, with a lowest corresponding cost may be selected as the start time for the new operation.

One or more embodiments described in this Specification and/or recited in the claims may not be included in this General Overview section.

2. Operation Scheduling Framework

Figure 1:
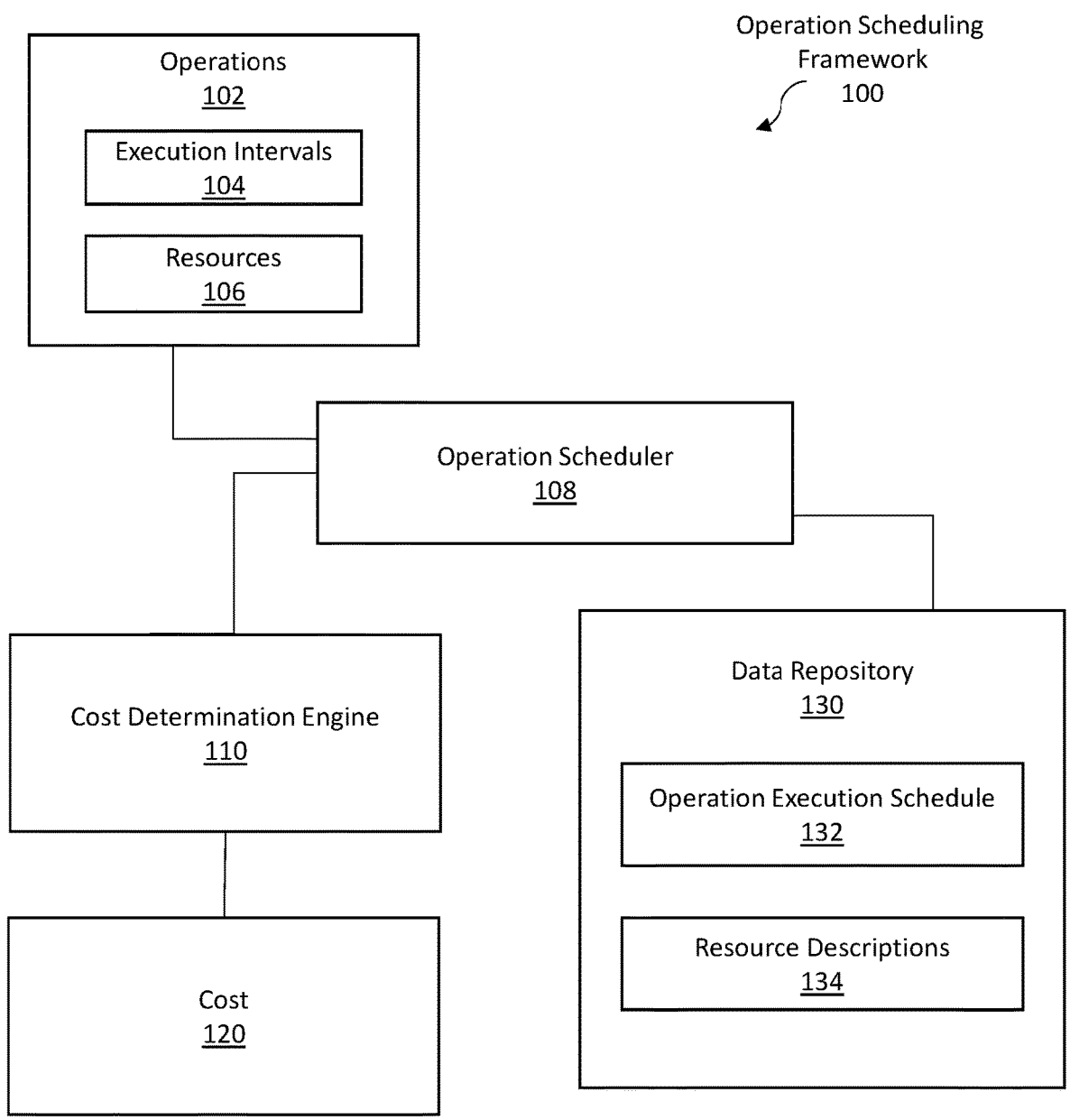
FIG. 1 illustrates a system for scheduling a periodic activity in accordance with one or more embodiments.

FIG. 1 illustrates an operation scheduling framework 100 in accordance with one or more embodiments. An operation scheduler 108 schedules periodic activities using a cost determination engine 110. As illustrated in FIG. 1, the operation scheduling framework 100 includes an operation scheduler 108, a cost determination engine 110, and a data repository 130. In one or more embodiments, the operation scheduling framework 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the operation scheduler 108 includes hardware and/or software components for scheduling an operation for periodic execution. The operation scheduler 108 schedules operations 102 to improve a balance of the use of resources 106 across different time periods. Resources include, but are not limited to, memory such as random access memory (RAM); disk input/output (I/O) components, hardware processors, and network resources such as bandwidth. As an example, if hundreds of operations 102 were executed at the same time, the execution of the operations would significantly burden the resources 106. Further, many operations 102 take a discrete amount of time to complete. Thus, if two operations that each take a minute to complete were scheduled to start thirty seconds apart, the operations would overlap, burdening resources, although the operations do not have the same start time.

In an embodiment, the data repository 130 is any type of storage unit and/or device (e.g., a file system, database, collection of tables, or any other storage mechanism) for storing data. Further, the data repository 130 may include multiple different storage units and/or devices. The multiple different storage units and/or devices may or may not be of the same type or located at the same physical site. Furthermore, the data repository 130 may be implemented or may execute on the same computing system as the operation scheduler 108 and the cost determination engine 110. Alternatively or additionally, the data repository 130 may be implemented or executed on a computing system separate from the operation scheduler 108 and the cost determination engine 110. The data repository 130 may be communicatively coupled to the operation scheduler 108 or cost determination engine 110 via a direct connection or via a network.

In an embodiment, the data repository 130 includes an operation execution schedule 132 and resource descriptions 134. The operation execution schedule 132 may be a list of scheduled operations and their associated start times. As an example, the operation execution schedule 132 may indicate that a file backup operation is to be executed every Friday at 9 pm. As another example, the operation execution schedule 132 may indicate that a virus scan is to be executed daily at 2 am. The operation execution schedule 132 may be stored as a function (e.g., an initial start time and an interval used to compute all other start times for the periodically scheduled operation).

In an embodiment, resource descriptions 134 describe the resources available for executing the operations 102. Resource descriptions 134 may identify, for example, a number of hardware processors available for execution and the processing speed of each processor. The operation execution schedule 132 and resource descriptions 134 may be stored in contiguous memory locations or non-contiguous memory locations of the data repository 130.

In an embodiment, the operation scheduler 108 schedules an operation 102 at an execution interval 104. For example, an operation may need to be periodically executed every 10 minutes. In this case, the operation scheduler 108 would configure a ten-minute execution interval for execution of the operation. The execution interval may be specified, for example, in milliseconds, seconds, minutes, hours, weeks, months, or years. A time period during which an operation may be executed may also be specified. For example, an operation is to be executed every hour, but may not be executed in the first five minutes after the start of the hour. In this case, the time period for execution of the operation is the latter fifty-five minutes of each hour.

In an embodiment, a cost determination engine 110 includes hardware and/or software for determining a cost 120 associated with a candidate start time. The cost determination engine 110 may receive a request to determine the cost 120 for one or more candidate start times from the operation scheduler 108. The cost determination engine 110 may determine the cost 120 based at least in part on the operation execution schedule 132.

The cost for a particular candidate start time may correspond to any value which may be interpreted on a scale relative to costs for other candidate start times. As an example, the cost for one candidate start time may be 3.4 out of 10, whereas the cost for another candidate start time may be 8.6 out of 10. In another example, the cost may be presented as letters (e.g., A, B, C, D . . . ).

An increase in cost of a candidate start time for a new operation represents an increase in estimated resource utilization. As an example, a cost for a candidate start time (for a new operation) on the high end of a cost scale may reflect that other previously scheduled operations start at respective times that are close to the candidate start time for the new operation. When the start times, of the previously scheduled operations, are close to the candidate start time for the new operation, there is high likelihood of concurrent access to the resources used by both the previously scheduled operations and the new operation. A cost for a candidate start time (for a new operation) on the low end of a cost scale may reflect that other previously scheduled operations start at respective times that are far from the candidate start time for the new operation. When the start times, of the previously scheduled operations, are far from the candidate start time for the new operation, there is low likelihood of concurrent access to the resources used by both the previously scheduled operations and the new operation. Accordingly, the cost determination engine 110 may determine the cost 120 for a new operation based, at least in part, on the start times of previously scheduled operations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

3. Scheduling a Start Time for a Periodic Operation

Figure 2:
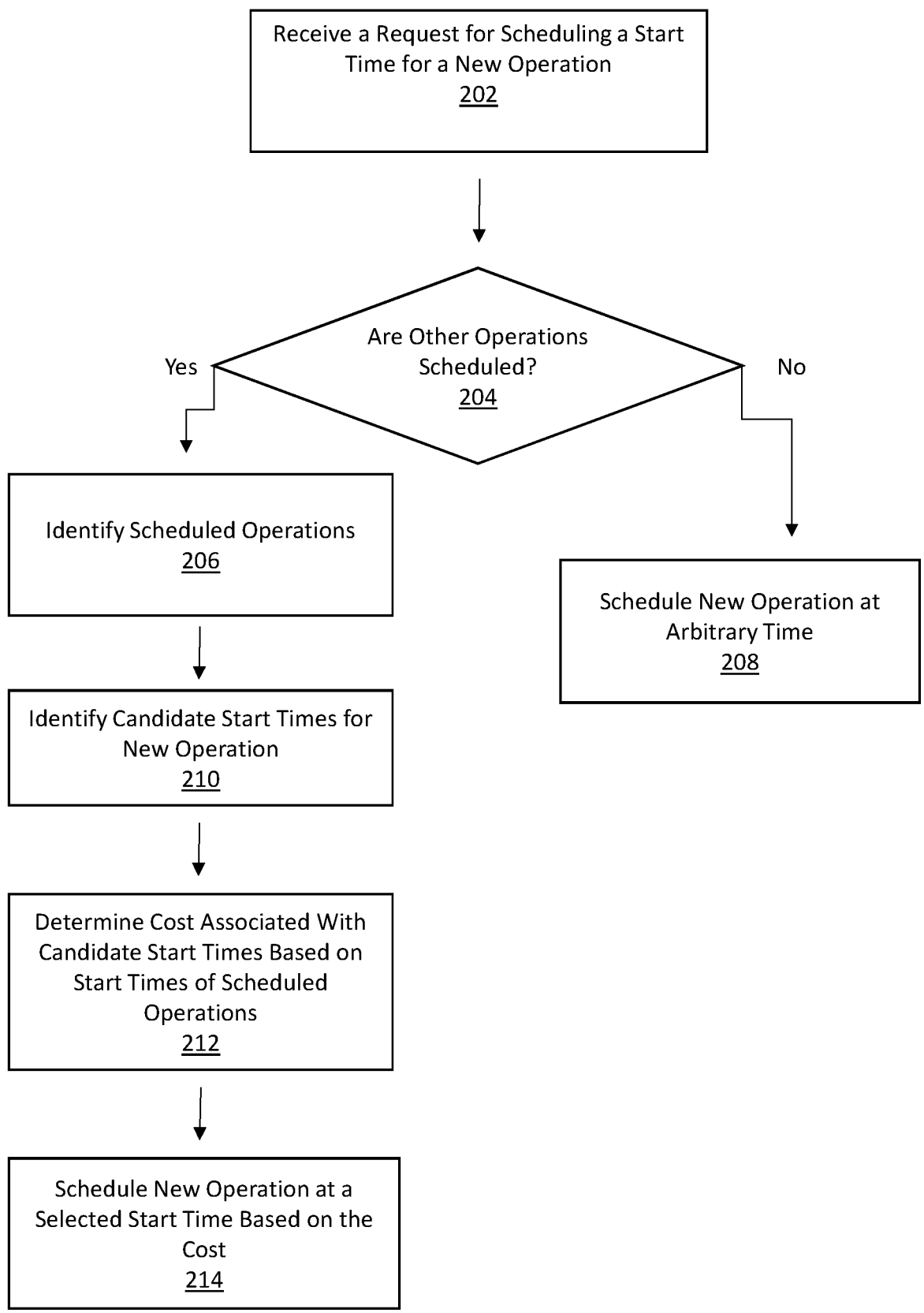
FIG. 2 illustrates an example set of operations for scheduling a start time for an operation in accordance with one or more embodiments.

FIG. 2 illustrates an exemplary set of operations for scheduling a start time for a periodic operation, in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, the operation scheduler receives a request for scheduling a start time for a new operation 202. For example, the operation scheduler may receive a request from a user to schedule a periodic operation. The request may indicate that data is to be copied from a local machine to cloud storage every day at the same time of day. A schedule may specify a first time (e.g., one week after creation) at which the system is to begin periodically replicating data from primary storage to secondary storage. A system may schedule an operation as part of a larger process.

Subsequent to receiving a request to schedule a start time for a new operation, the operation scheduler determines whether other operations have been previously scheduled (Operation 204). If no other operations are scheduled, the operation scheduler may schedule the new operation at an arbitrary time (Operation 208). Scheduling the operation at an "arbitrary time" as referred to herein, includes using any algorithm to determine the start time which is not based on previously scheduled operations. The operation scheduler may select a start time that is at the beginning of a time period during which the new operation may be scheduled. Alternatively, the operation scheduler may schedule the new operation based on historic usage statistics. As an example, the operation scheduler may receive a request to schedule a new operation once daily. The operation scheduler determines that no other operations have been previously scheduled. As a result, the operation scheduler determines usage statistics to select a time for scheduling the new operation. The operation scheduler determines that system resources are typically used from 7 am to 6 pm and not typically used from 6 pm to 7 am. Based on the low or no usage period from 6 pm to 7 am, the operation scheduler schedules the new operation for 6 pm daily. Usage statistics, as described above, may be used in combination with the cost analysis for candidate start times described herein.

If other operations are previously scheduled, the operation scheduler determines a start time for the new operation based at least on previously scheduled operations. The operation scheduler identifies the previously scheduled operations from an operation execution schedule (Operation 206). For example, the operation scheduler may determine that a periodic operation has been previously scheduled to execute every fifteen minutes: at the start of every hour, fifteen minutes after the start of each hour, thirty minutes after the start of every hour, and forty-five minutes after the start of each hour. As another example, the operation scheduler may identify three operations scheduled for periodic execution at respective times. The three operations may be scheduled for execution once every minute, once per day, and once per month, respectively.

In an embodiment, the operation scheduler identifies candidate start times for the new operation based on the interval at which the new operation is to be scheduled (Operation 210). The operation scheduler selects a time period corresponding to a length of the interval at which the new operation is to be scheduled. As an example, an operation scheduler receives a request at 8:55 pm to schedule a new operation every fifteen minutes. The operation scheduler identifies a fifteen-minute time period from 9 pm to 9:15 pm based on the interval size of fifteen minutes. In this example, the time period is selected to start five minutes after the time the request is received (9 pm is five minutes after 8:55 pm). However, the time period may be selected after any amount of time subsequent to when the request is received. Subsequent to determining the time period, the operation scheduler selects a set of candidate start times within the time period. The candidate start times may be selected at any level of granularity (e.g., every minute within the time period, every thirty seconds within the time period, etc.). Continuing the example, the operation scheduler may select candidate start times every minute within the fifteen-minute time period from 9 pm to 9:15 pm (e.g., 9:00 pm, 9:01 pm, 9:02 pm . . . 9:14 pm). Alternatively, the operation scheduler may select candidate start times every two minutes (e.g., 9:00 pm, 9:02 pm, 9:04 pm . . . 9:14 pm).

In an embodiment, the operation scheduler selects multiple time periods corresponding to the interval for scheduling the new operation. The cost analysis for a particular candidate start time is computed using an average of the start times, from each of the multiple time periods, that correspond to the candidate start time. Continuing the above example, the operation scheduler may select fifteen-minute time periods from 9 pm to 9:15 pm, 9:15 to 9:30 pm, 9:30 pm to 9:45 pm, and 9:45 to 10 pm. The candidate start time 9:01 pm from the first time period corresponds to the candidate start times 9:16 pm, 9:31 pm, and 9:46 pm (one minute after the start of each time period). Determining the cost for any candidate start time (e.g., 9:01 pm), described below in further detail, may include averaging the costs determined for candidate start times 9:01 pm, 9:16 pm, 9:31 pm, and 9:46 pm. Analyzing the candidate start time (one minute from the start of each time period) across different time periods may be necessary to incorporate the effect of less frequently executed operations that have been previously scheduled. A previously scheduled operation may be scheduled for execution every thirty minutes. The previously scheduled operation may only be determined for two intervals (9:15 pm to 9:30 pm and 9:45 pm to 10 pm) of the four time intervals (9:15 pm to 9:30 pm, 9:30 pm to 9:45 pm, and 9:45 to 10 pm). As a result, consideration of only the first time period (9:00 pm to 9:15 pm) which does not include the previously scheduled operation may not yield a complete cost analysis. Other possible calculations of incorporating the previously scheduled operation in the cost analysis may include multiplying a fraction of (a) the interval of the new operation to (b) the interval of the previously scheduled time interval (15 minutes/30 minutes) to a cost component associated with the previously scheduled time interval. Examples below further describe the above computation and alternate computations that may be executed in accordance with one or more embodiments.

In an embodiment, the cost determination engine determines the cost associated with candidate start times for the new operation (Operation 212). As described above, the candidate start times within a time period may be identified. The cost determination engine may determine a cost for each candidate start time based on the start times, of previously scheduled operations, within the same time period. Specifically, the cost determination engine determines the cost based at least on a difference value between (a) a candidate start time for the new operation and (b) each start time within the same time period of previously scheduled operations. The cost determination engine executes a function which computes a cost that decreases in proportion to the increase in the difference values. The function may compute a cost that exponentially decreases in proportion to the increase in the difference values. A difference value of zero is computed when the candidate start time is the same as a start time of a previously scheduled operation.

As noted above, the cost determination engine determines the cost based at least on a difference value between (a) a candidate start time for the new operation and (b) each start time within the same time period of previously scheduled operations. Computing the difference value for the candidate start time with respect to multiple start times, within the same time period, of one or more previously scheduled operations results in multiple difference values. The cost determination engine assigns a cost component (and/or weight) to each difference value resulting in multiple cost components. The cost for the candidate start time is computed as a function of the multiple cost components.

Continuing the above example, a particular time period from 9:00 am to 9:15 am is selected for scheduling a first execution of a new operation that is to be periodically executed every fifteen minutes. Within the particular time period, the start times 9:00 pm, 9:01 pm, 9:02 pm, 9:03 pm . . . 9:14 pm are identified as candidate start times for the new operation. The cost determination engine identifies a start time of one previously scheduled operation as 9:07 pm. The difference values for each of the candidate start times may be computed as follows:

| Candidate Start Time | Start Time of Previously Scheduled Operation | Difference Value |
| --- | --- | --- |
| 9:00 | 9:07 | 0:07 |
| 9:01 | 9:07 | 0:06 |
| 9:02 | 9:07 | 0:05 |
| 9:03 | 9:07 | 0:04 |
| 9:04 | 9:07 | 0:03 |
| 9:05 | 9:07 | 0:02 |

| Candidate Start Time | Start Time of Previously Scheduled Operation | Difference Value |
| --- | --- | --- |
| 9:06 | 9:07 | 0:01 |
| 9:07 | 9:07 | 0:00 |
| 9:08 | 9:07 | 0:01 |
| 9:09 | 9:07 | 0:02 |
| 9:10 | 9:07 | 0:03 |
| 9:11 | 9:07 | 0:04 |
| 9:12 | 9:07 | 0:05 |
| 9:13 | 9:07 | 0:06 |
| 9:14 | 9:07 | 0:07 |

As illustrated above, the candidate start times of 9:00 and 9:14 correspond to the highest difference with the start time 9:07 of the previously scheduled operation. The cost determination engine computes a lowest cost (of all costs computed for the various candidate start times) for the candidate start times 9:00 and 9:14 based on the highest difference value.

The cost determination engine computes a highest cost for the candidate start time 9:07 which has the lowest difference value ('0') with the start time 9:07 of the previously scheduled operation.

In an embodiment, the cost determination engine analyzes the start times of multiple different previously scheduled operations. The cost determination engine determines a cost for each candidate start time for a new operation based on the start times of the multiple different previously scheduled operations. The cost determination engine determines a cost component attributable to each previously scheduled operation. The interval of each previously scheduled operation is used to determine a weight assignable to the cost component attributable to each of the previously scheduled operations. As an example, a first previously scheduled operation, that is scheduled twice as frequently as a second previously scheduled operation, may have a weight assignment that is twice the weight assignment of the second previously scheduled operation. Example computations relating to multiple different previously scheduled operations, which should not be construed as limiting the scope of the claims, are described below.

In an embodiment, the operation scheduler receives the cost for each of the candidate start times from the cost determination engine. The operation scheduler selects a candidate start time with the lowest cost as a start time for the periodic execution of the new operation (Operation 214). The operation scheduler schedules the execution of the new operation in the operation execution schedule. The operation scheduler may compute all start times based on the interval and specify the computed start times. The operation scheduler may note a function in the operation execution schedule which includes the initial start time and the interval.

4. Example Embodiments

Figure 3:
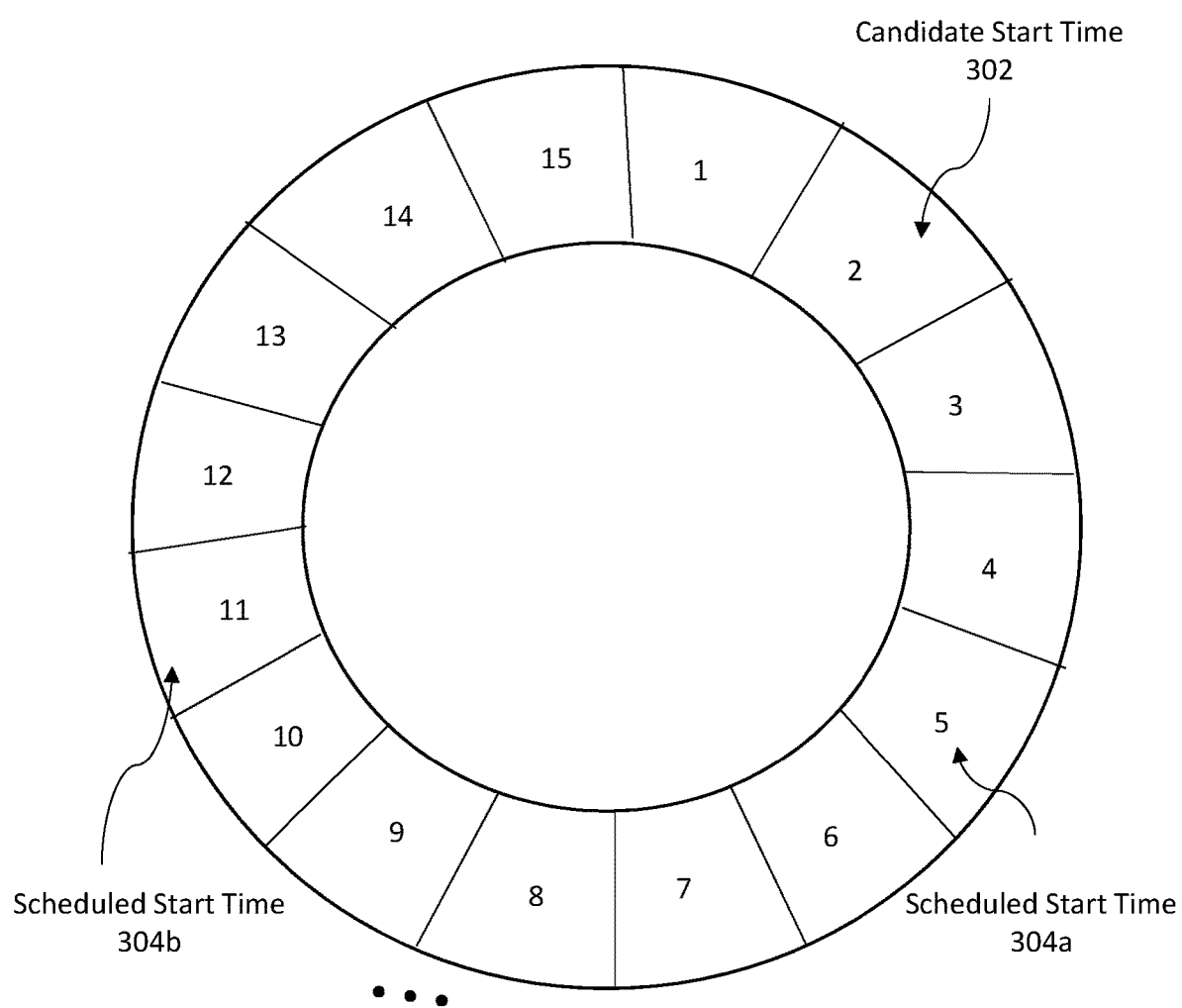
FIG. 3 illustrates a representation of periodic start times.

FIG. 3 illustrates an example in which the operation scheduler schedules an operation to be performed every 15 minutes. Thus, the operation scheduler identifies fifteen potential candidate start times, one for every minute in the interval. The operation scheduler further identifies two previously scheduled start times 304a, 304b. Considering one particular candidate start time 302 at minute 2, the operation scheduler determines the difference in time between the candidate start time 302 and each scheduled start time 304a, 304b. Counting in a clockwise fashion, the difference in time is 3 minutes for start time 304a and 9 minutes for start time 304b. But, counting in a counterclockwise fashion, the difference in time is 12 minutes for start time 304a and the difference in time is 6 minutes for start time 304b. Thus, it is possible to overestimate the time difference between periodic operations. Representing the possible candidate start times in a circular fashion enables the selection of the shortest difference in time, regardless of direction. For example, the operation scheduler may represent candidate start times as a circular array.

Figure 4A:
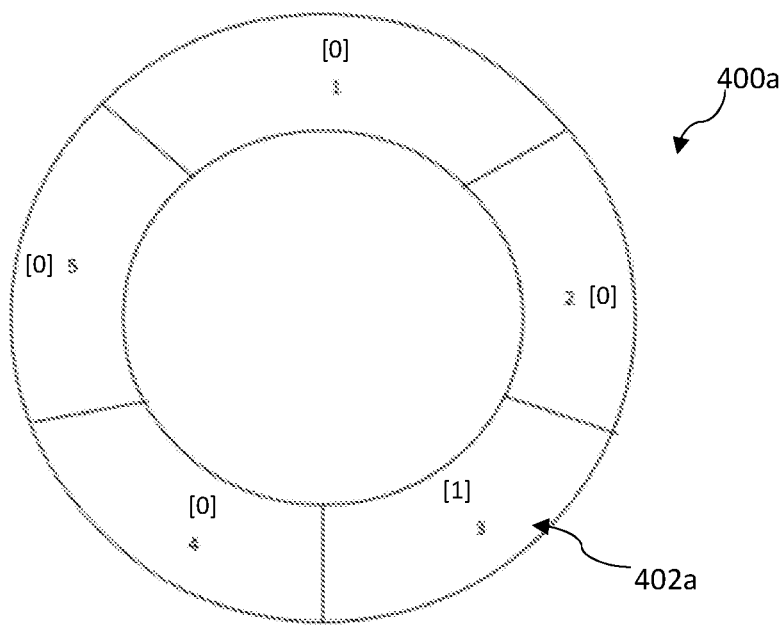
FIGS. 4A-4B illustrate representations of candidate and previously scheduled start times.
Figure 4B:
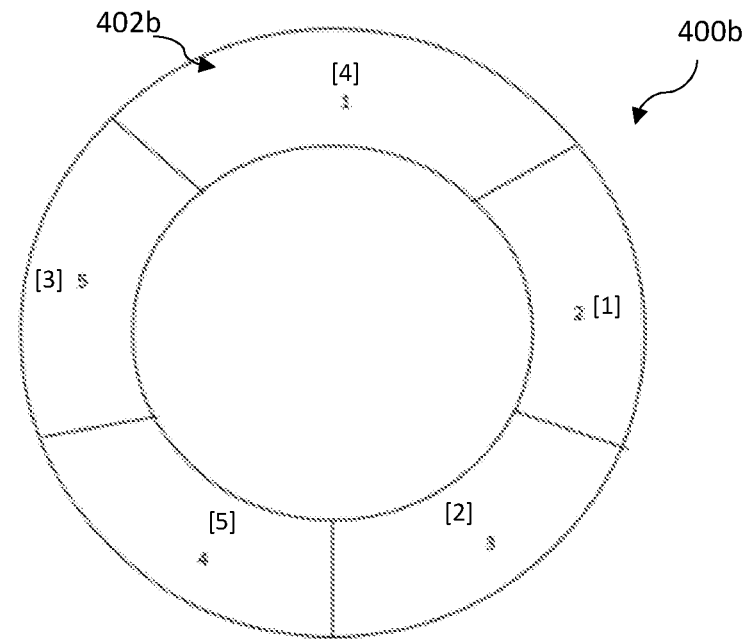

FIGS. 4A-4B illustrate exemplary operations for calculating the cost for a particular candidate start time. One or more operations described herein may be modified, rearranged, or omitted altogether. Accordingly, the particular sequence of operations illustrated described below should not be construed as limiting the scope of one or more embodiments.

A. A New Operation to be Executed Every 5 Minutes

FIG. 4A illustrates an example in which an operation is to be performed every 5 minutes. This may be referred to as a "new operation" or a "first operation." Because there are five minutes in the interval, the operation scheduler identifies five possible starting minutes. Five candidate start times (numbered 1-5) are shown in circular representation 400a.

In the example shown in FIG. 4A, there is one previously scheduled operation 402a (also referred to herein as a "second operation") in this interval. In FIG. 4, the number of previously scheduled operations for each minute in the interval is shown in brackets. In this case, there is only one operation scheduled, at minute 3. Hence, the time slot for minute three contains a 1 in brackets, while the time slots for the other four minutes contain zeroes in brackets.

In an embodiment, the operation scheduler determines the cost for a particular candidate start time as a function of the difference between the particular candidate start time and the start time of the second operation. To ensure that the cost increases with proximity to the start time of the second operation, the operation scheduler sets the lowest cost for the candidate start time farthest from the start time of the second operation. This lowest cost could be set to any number; by way of example here, it is set to one. The cost for each successively nearer candidate start time may then be multiplied by a constant ("K"), such that the cost increases as the particular candidate start time approaches the start time of the second operation. For example, a constant of K=2 will be used here.

In FIG. 4A, there is a second operation 402a scheduled to be performed at minute 3. There are two farthest start times from the second operation start time, at minutes 1 and 5. Thus, minutes 1 and 5 are each assigned a cost of 1. Stepping towards the second operation start time 402a, minutes 2 and 4 are next. The cost associated with minutes 2 and 4 is 1×2=2 (the cost for the next-farthest candidate start time multiplied by K=2). Stepping towards the second operation start time 402a once again, minute 3 is next. The cost for minute 3 is 2×2=4 (the cost for the next-farthest candidate start time times K=2).

Thus, the cost grows in an exponential fashion as the difference between the particular start time and the start time of the second operation decreases. It has been found that this yields a satisfactory distribution of start times.

Having calculated a cost for each potential candidate start time, the operation scheduler selects the start time with the lowest cost, to minimize interference between operations. In this particular example, minutes 1 and 5 each have a cost of 1. Either of these start times could be selected with minimal interference from the second operation. In an embodiment, the operation scheduler selects the first in time of the minimum cost alternatives (minute 1 here). Alternatively, the operation scheduler could choose one of the minimum cost alternatives randomly, such as with a random number generator.

B. Multiple Operations are Previously Scheduled

FIG. 4B illustrates an example in which a first operation is to be performed every five minutes. Five candidate start times (numbered 1-5) are shown in circular representation 400b. Multiple operations (a "second operation," "third operation," etc.) have already been scheduled to occur in this particular interval. As indicated by the numbers in brackets, there are four previously scheduled operations at minute 1 (402b), 1 previously scheduled operation at minute 2, and so forth. In the following example, the operation scheduler takes these different quantities of previously scheduled operations into account in calculating a cost.

In an embodiment, the cost for each particular candidate start time is a function of a weight factor that varies with the difference in time between a particular candidate start time and each other potential start time. The cost is also a function of the number of scheduled operations at a given start time, or "counts." The counts for each candidate start time are shown in brackets in FIG. 4B.

In an embodiment, the operation scheduler sets the lowest weight $W_{min}$ and the highest weight $W_{max}$ to specified values. For example, the operation scheduler sets $W_{min}$ equal to 1.0, for the time farthest from the particular candidate start time for which the cost is being calculated. The operation scheduler sets $W_{max}$ equal to 4.0, for the particular candidate start time for which the cost is being calculated. Other values could, however, be selected for $W_{min}$ and $W_{max}$.

The operation scheduler then determines a weight for each remaining potential start time by multiplying the weight of the next farthest start time from the particular candidate start time by a constant K. This constant is equal to the $N^{th}$ root of the ratio of the maximum weight value to the minimum weight value, where N is the number of steps from the most distant time to the start time for which the cost is being calculated:

$$K = \sqrt[N]{\frac{Wmax}{Wmin}}$$

For example, to determine the cost for a candidate start time at minute 1 (402b), the maximum weight value is $W_1 = W_{max} = 4.0$.

There are two potential start times which are most distant from the particular candidate start time 402b, at minutes 3 and 4. These start times are 2 minutes from the particular candidate start time 402b, thus, N=2. The weight is set to $W_{min}=1.0$ for minutes 4 and 3.

$W_4 = W_3 = 1.0$

The value of the constant K is $$K = \sqrt[N]{\frac{Wmax}{Wmin}} = \sqrt[2]{\frac{4.0}{1.0}} = 2.0.$$

Stepping in towards the particular candidate start time at minute 1, the next nearest start times are at minutes 2 and 5. The weight for minutes 2 and 5 is:

$W_2 = W_5 = W_3 K = (1.0)(2.0) = 2.0$

Using these weights, the operation scheduler determines the cost as the sum of the weighted count values. Thus, for the candidate start time at minute 1, the cost is:

$\Sigma W_i C_i = W_1 C_1 + W_2 C_2 + W_3 C_3 + W_4 C_4 + W_5 C_5 = (4.0)(4) + (2.0)(1) + (1.0)(2) + (1.0)(5) + (2.0)(3) = 31.0$ Executing the above process for each of the four remaining candidate start times in the interval yields a cost of 24.0 for minute 2, 27.0 for minute 3, 35.0 for minute 4, and 33.0 for minute 5. Thus, the start time candidate with the lowest cost is at minute 2.

C. New Operation to be Performed more Frequently than Previously Scheduled Operation The counts values described above need not be integers. Consider the case in which the operation scheduler receives a request to schedule a first operation, while a second operation has already been scheduled. The first operation is to be performed more frequently than the second operation. For example, the second operation is scheduled to be executed on a daily basis, and the first operation is to be executed once per hour. There are 60 candidate start times for the new hourly operation. There is only one hour in the day in which the second operation occurs. Thus, the second daily operation will only collide with the new hourly operation one time out of every 24 hourly updates. In this case, the counts value for this time slot is 1/24=0.0417.

As another example, the operation scheduler receives a request for scheduling a start time for a new operation, to be executed every 10 minutes. The operation scheduler identifies a previously scheduled operation that is to be executed every 30 minutes at 18 minutes after the hour. In this case, the operation scheduler applies a counts value of 10/30=0.3333 to the eighth candidate starting time for the new operation.

D. Independent Selection of Hour and Minute

In an embodiment, if the operation scheduler receives a request to schedule an operation to occur at an interval greater than or equal to an hour, the hour and minute of the start time may be independently selected. The operation scheduler may select an hour and minute together by considering the 1440 minutes in a day. Alternatively, the hour, the minute, or both may be specified independently. For instance, the operation scheduler may receive a request to schedule an operation during a specified hour. In another example, the operation scheduler sets the minute to begin an operation to a default value.

For example, the operation scheduler receives a request to perform an operation every day during the hour commencing at 3 pm. The operation scheduler must then select the minute within that hour. To determine the starting minute within the chosen hour, the operation scheduler identifies candidate start times for every possible hour and minute combination in a day, but then restricts the cost determination to 60 candidate start times—only considering the sixty minutes in the hour commencing at 3 pm.

Similarly, the operation scheduler may receive a request to schedule an operation with a particular minute for the starting time. For example, the operation scheduler receives a request that an operation occurs every day at 5 minutes after the hour, and the operation scheduler further receives a request to determine the best hour at which to commence the operation. In this case, the operation scheduler creates candidate start times for every hour and minute in a day, but restricts the cost determination to only include the fifth minute in every hour.

E. Weekly or Greater Intervals

In an embodiment, the operation scheduler bifurcates the selection process for weekly or greater operation frequencies. This is useful for efficiency of computation. For example, computing the cost using a single array for a weekly update would require a 10,080-element array. As an alternative, more efficient method, the operation scheduler splits the selection process into two steps.

For a new weekly update, first, the operation scheduler selects a day of the week. There are only 7 potential days within the week to choose from. The operation scheduler identifies scheduled start times for the execution of other operations. Operations scheduled to be executed daily or multiple times per day are ignored, as daily operations do not affect one day of the week more than another. Similarly, operations scheduled to be performed monthly are ignored, because monthly operations will fall on a given day of the week with equal likelihood. Thus, for selecting the day of the week, the operation scheduler only considers scheduled weekly updates. Given a chosen day of the week, the operation scheduler then selects an hour and minute of the day from the 1,440 minutes in a day.

Similarly, to schedule a monthly operation, the operation scheduler selects a day within the month first. The operation scheduler selects the day of the month from the first 28 days of a month, as this is the number of days that are guaranteed to appear in a month. The operation scheduler only considers other previously scheduled monthly operations, as each weekly, daily, or smaller interval has the same impact on the day of the month. Given a chosen day of the month, the operation scheduler then selects the hour and minute of the day.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
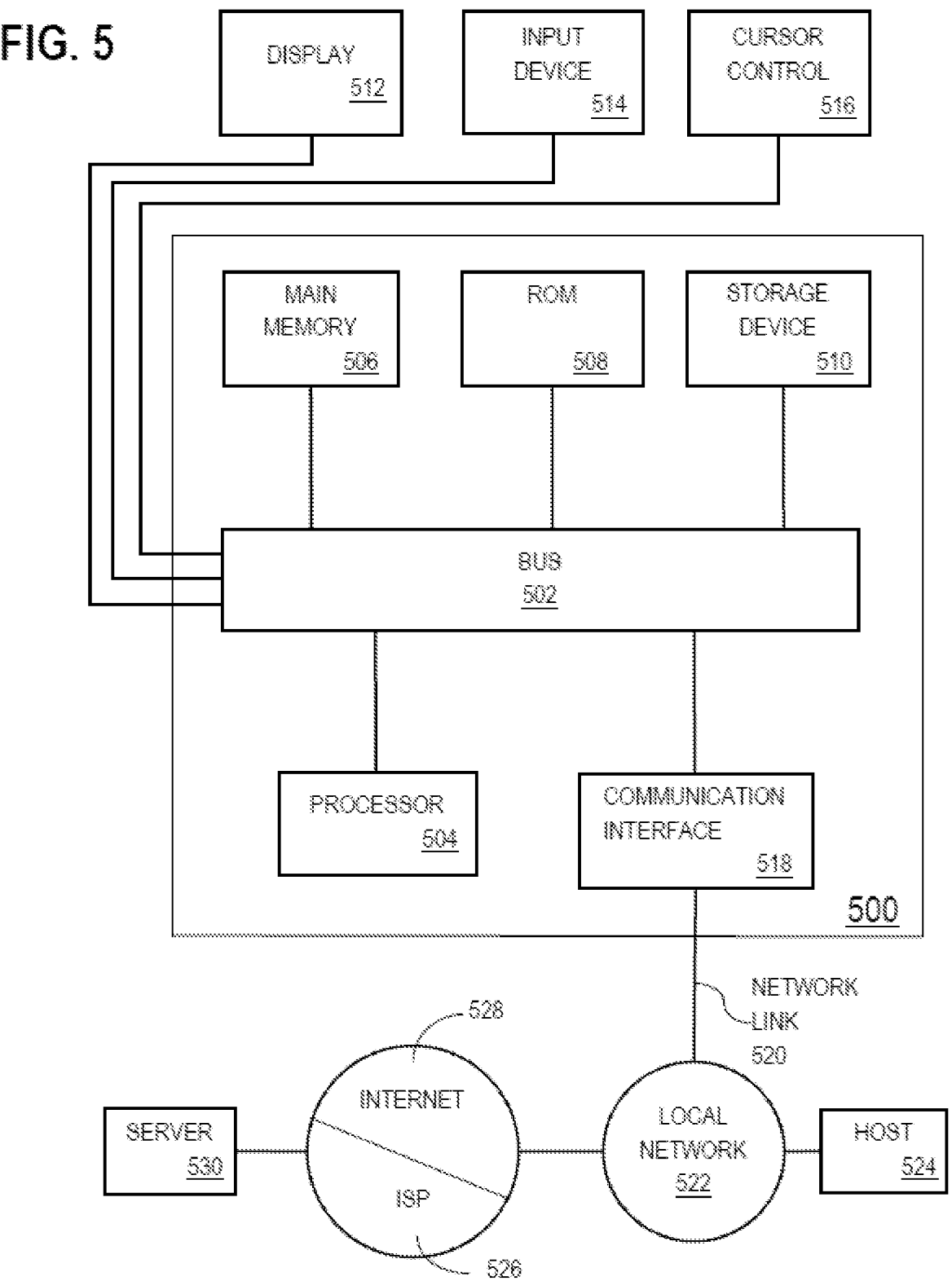
FIG. 5 illustrates a block diagram of a system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media include, for example, optical or magnetic disks, such as storage device 510.

Volatile media include dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media are distinct from but may be used in conjunction with transmission media. Transmission media participate in transferring information between storage media. For example, transmission media include coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a particular period of time during which a first operation is to be executed;
   identifying a plurality of candidate start times within the particular time period for executing the first operation;
   computing a first time difference between (a) a scheduled start time of a second operation and (b) a first candidate start time of the plurality of candidate start times;
   computing, based at least on the first time difference, a first cost for scheduling the first operation at the first candidate start time;
   computing a second time difference between (a) the scheduled start time of the second operation and (b) a second candidate start time of the plurality of candidate start times;
   computing, based at least on the second time difference, a second cost for scheduling the first operation at the second candidate start time;
   responsive at least to determining that the first cost is lower than the second cost, selecting the first candidate start time for scheduling the first operation.

2. The medium of claim 1, wherein the first operation is a data replication operation.

3. The medium of claim 1, wherein the first cost for scheduling the first operation at the first candidate start time decreases in proportion to the first time difference.

4. The medium of claim 1, wherein the first cost for scheduling the first operation at the first candidate start time decreases exponentially in proportion to the first time difference.

5. The medium of claim 1, wherein determining the cost for a particular candidate start time comprises:
   responsive to determining that the first operation is to be executed weekly:
   identifying scheduled start times for a subset of the other operations that are to be executed weekly;
   based upon the scheduled start times for the subset of the other operations to be executed weekly, selecting a particular day of the week with a smallest number of scheduled start times for the subset of the other operations to be executed weekly;
   wherein the start time for the first operation is selected on the particular day of the week.

6. The medium of claim 1, wherein the medium further comprises instructions which causes performance of operations comprising:

computing a third time difference between (a) a start time of a third operation and (b) a third candidate start time of the plurality of candidate start times;

computing, based at least on the third time difference, a third cost for scheduling the first operation at the third candidate start time.

7. A method comprising:

identifying a particular period of time during which a first operation is to be executed;

identifying a plurality of candidate start times within the particular time period for executing the first operation;

computing a first time difference between (a) a scheduled start time of a second operation and (b) a first candidate start time of the plurality of candidate start times;

computing, based at least on the first time difference, a first cost for scheduling the first operation at the first candidate start time;

computing a second time difference between (a) the scheduled start time of the second operation and (b) a second candidate start time of the plurality of candidate start times;

computing, based at least on the second time difference, a second cost for scheduling the first operation at the second candidate start time; and responsive at least to determining that the first cost is lower than the second cost, selecting the first candidate start time for scheduling the first operation;

wherein the method is performed by at least one device including a hardware processor.

8. The method of claim 7, wherein the first operation is a data replication operation.

9. The method of claim 7, wherein the first cost for scheduling the first operation at the first candidate start time decreases in proportion to the first time difference.

10. The method of claim 7, wherein the first cost for scheduling the first operation at the first candidate start time decreases exponentially in proportion to the first time difference.

11. The method of claim 7, wherein determining the cost for a particular candidate start time comprises:

responsive to determining that the first operation is to be executed weekly:

identifying scheduled start times for a subset of the other operations that are to be executed weekly;

based upon the scheduled start times for the subset of the other operations to be executed weekly, selecting a particular day of the week with a smallest number of scheduled start times for the subset of the other operations to be executed weekly;

wherein the start time for the first operation is selected on the particular day of the week.

12. The method of claim 7, wherein determining the cost for a particular candidate start time, of the plurality of candidate start times, comprises:

computing a third time difference between (a) a start time of a third operation and (b) a third candidate start time of the plurality of candidate start times;

computing, based at least on the third time difference, a third cost for scheduling the first operation at the third candidate start time.

13. A system comprising:

one or more hardware processors;

one or more non-transitory computer-readable media storing instructions which, when executed by the one or more hardware processors, cause execution of operations comprising:

identifying a particular period of time during which a first operation is to be executed;

identifying a plurality of candidate start times within the particular time period for executing the first operation;

computing a first time difference between (a) a scheduled start time of a second operation and (b) a first candidate start time of the plurality of candidate start times;

computing, based at least on the first time difference, a first cost for scheduling the first operation at the first candidate start time;

computing a second time difference between (a) the scheduled start time of the second operation and (b) a second candidate start time of the plurality of candidate start times;

computing, based at least on the second time difference, a second cost for scheduling the first operation at the second candidate start time; and responsive at least to determining that the first cost is lower than the second cost, selecting the first candidate start time for scheduling the first operation.

14. The system of claim 13, wherein the first operation is a data replication operation.

15. The system of claim 13, wherein the first cost for scheduling the first operation at the first candidate start time decreases in proportion to the first time difference.

16. The system of claim 13, wherein the first cost for scheduling the first operation at the first candidate start time decreases exponentially in proportion to the first time difference.

17. The system of claim 13, wherein determining the cost for a particular candidate start time comprises:

responsive to determining that the first operation is to be executed weekly:

identifying scheduled start times for a subset of the other operations that are to be executed weekly;

based upon the scheduled start times for the subset of the other operations to be executed weekly, selecting a particular day of the week with a smallest number of scheduled start times for the subset of the other operations to be executed weekly;

wherein the start time for the first operation is selected on the particular day of the week.

* * * * *